US009251334B1

(12) United States Patent
Molitor et al.

(10) Patent No.: US 9,251,334 B1
(45) Date of Patent: Feb. 2, 2016

(54) ENABLING PLAYBACK OF MEDIA CONTENT

(71) Applicant: Amazon Technologies, Inc., Reno, NV (US)

(72) Inventors: Eric Michael Molitor, London (GB); Piers George Cowburn, London (GB)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 14/169,049

(22) Filed: Jan. 30, 2014

(51) Int. Cl.
*G06F 21/44* (2013.01)
*G06F 21/10* (2013.01)

(52) U.S. Cl.
CPC .............. *G06F 21/44* (2013.01); *G06F 21/105* (2013.01)

(58) Field of Classification Search
None
See application file for complete search history.

(56) References Cited

U.S. PATENT DOCUMENTS

| | | | | |
|---|---|---|---|---|
| 8,769,304 | B2* | 7/2014 | Kirsch | 713/189 |
| 2007/0100701 | A1* | 5/2007 | Boccon-Gibod et al. | 705/21 |
| 2008/0103983 | A1* | 5/2008 | Jang et al. | 705/75 |
| 2008/0114958 | A1* | 5/2008 | Jogand-Coulomb et al. | 711/164 |
| 2008/0282083 | A1* | 11/2008 | Risan et al. | 713/153 |
| 2009/0260064 | A1* | 10/2009 | McDowell et al. | 726/4 |
| 2010/0229229 | A1* | 9/2010 | Kumar et al. | 726/7 |
| 2011/0225417 | A1* | 9/2011 | Maharajh et al. | 713/150 |
| 2013/0067243 | A1* | 3/2013 | Tamayo-Rios et al. | 713/193 |
| 2013/0198516 | A1* | 8/2013 | Fenton et al. | 713/168 |
| 2014/0189808 | A1* | 7/2014 | Mahaffey et al. | 726/4 |

* cited by examiner

*Primary Examiner* — Benjamin Lanier
(74) *Attorney, Agent, or Firm* — Thorpe North & Western LLP

(57) ABSTRACT

Technology is described for allowing playback of protected media content on an untrusted device. A request to entitle playback of the protected media content may be received from a trusted device. The request may include an outer encrypted message with location information for the trusted device and identity information for the trusted device and a nested encrypted message with a signed challenge processed by the untrusted device. An entitlement for the playback of the protected media content may be generated in response to verification of the request in the outer encrypted message and the nested encrypted message. The entitlement may be sent to the untrusted device via the trusted device. The entitlement may enable the untrusted device to play the protected media content for a defined duration.

18 Claims, 9 Drawing Sheets

ENABLING PLAYBACK OF MEDIA CONTENT

BACKGROUND

A user may consume and interact with numerous types of media content using electronic devices. For example, the user may listen to songs and audio books, watch movies and television programs, read electronic books, magazines, and newspapers, play electronic games, etc. The media content may be available to an electronic device via an electronic retail store. In one example, the media content may be protected from unauthorized use with digital rights management (DRM) protocols or similar technologies for controlling the use of the media content for sale or purchase. In addition, the user may interact with digital versions of the media content using a variety of electronic devices, such as mobile devices, tablet computers, e-book readers, laptops, televisions, desktop computers, etc.

DETAILED DESCRIPTION

Figure 1:
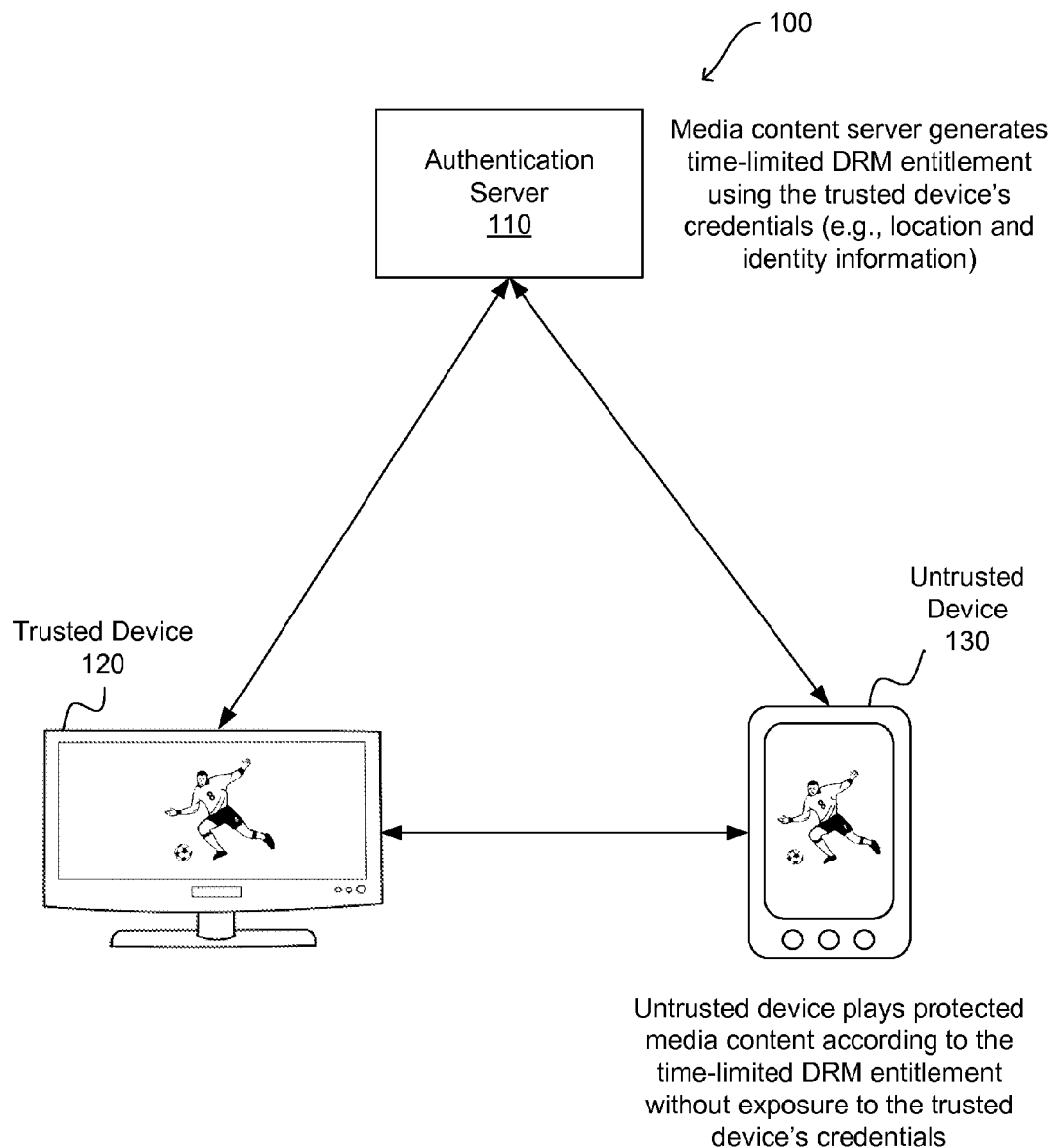
FIG. 1 illustrates a system for sending an entitlement for playback of protected media content to an untrusted device according to an example of the present technology.

Technology is described for allowing playback of protected media content on an untrusted device for a period of time when a trusted device remains within a geographic proximity or area initially reported to an authentication server. The term "trusted device" generally refers to an electronic device that has been authenticated by an authentication entity, such as authentication server (i.e., the electronic device may be trusted because the electronic device is associated with a known entity, customer account and/or identification information). The term "untrusted device" generally refers to an electronic device that has not been authenticated by the authentication entity (i.e., the electronic device may be untrustworthy because the electronic device is not associated with the known customer account and/or identification information). The trusted device and the untrusted device may be, but are not limited to, televisions, mobile devices, mobile phones, game consoles, tablet computers, etc. The term "protected media content" generally refers to media content (e.g., songs, videos, books, games, etc.) that is protected using digital rights management (DRM) protocols or similar technologies for controlling the sale or distribution of the media content.

In one example, the trusted device may be authorized to play the protected media content, but the untrusted device may be unauthorized to play the protected media content. More specifically, a user may be viewing a catalog containing an action movie on the trusted device (e.g., a mobile tablet). Then the user (or an additional user) may desire to watch the same action movie (or video clips related to the action movie) on the untrusted device (e.g., a television) instead. However, the DRM for the action movie may block playback of the action movie on the untrusted device. Therefore, as described in further detail below, the trusted device may communicate with the authentication server in order for the untrusted device to receive an entitlement which enables the untrusted device to begin playback of the protected media content (e.g., the action movie) for a limited duration and while the trusted device remains within a geographic proximity or area initially reported to the authentication server.

In order for the authentication server to generate the entitlement for the untrusted device, the trusted device may initially send a request for playback of the protected media content to the untrusted device. The untrusted device may make the request to play the protected media content to the authentication server. The authentication server may issue a challenge directly to the untrusted device in response to receiving the request via the trusted device. The untrusted device may process the challenge and provide one or more internal identifiers (IDs), time-based information and/or device identification information. The untrusted device may sign the processed challenge with its private key (i.e., encrypt the processed challenge using the untrusted device's private key) and send the processed challenge to the trusted device.

The trusted device may encrypt the processed challenge received from the untrusted device in a related request for playback of the protected media content. The related request may include the trusted device's current location (e.g., longitude and latitude), the customer's identity information, and/or device identity information. The trusted device may determine the current location using a global positioning system (GPS), wireless triangulation, near field communication (NFC), Bluetooth low energy (LE), etc. The related request may include an outer encrypted message and a nested encrypted message, wherein the nested encrypted message includes the processed challenge and the outer encrypted message includes the trusted device's location, customer identity and/or device identity information. The trusted device may encrypt the related request with its private key and send the request to the authentication server.

The authentication server may receive the related request from the trusted device. The authentication server may decrypt the related request (i.e., the outer encrypted message and the nested encrypted message) using the public keys associated with the trusted device and the untrusted device, respectively. The authentication server may respond to the untrusted device's processed challenge in the nested encrypted message by generating an entitlement for playback of the protected media content on the untrusted device for a defined duration. The entitlement may also be known as a DRM entitlement or a DRM lease. The authentication server may generate the entitlement, in part, by using the information in the outer encrypted message. The defined duration of the entitlement may vary depending on a mobility level of the trusted device. For example, the entitlement for a handheld device (e.g., a mobile phone) may be relatively short compared to a stationary device (e.g., a game console). Alternatively, the entitlement may be limited to a particular media content item (e.g., a television program).

The authentication server may encrypt the entitlement with the untrusted device's public key. In addition, the authentication server may encrypt an outer entitlement message that contains the entitlement using the trusted device's public key. The authentication server may send the outer entitlement message (which includes the entitlement) to the trusted device. The trusted device may decrypt the outer entitlement message using the trusted device's private key. Although the trusted device may be unable to decrypt the entitlement in the outer entitlement message because the trusted device does not have access to the untrusted device's private key, the trusted device may forward the entitlement to the untrusted device based information received upon decryption of the outer entitlement message. The untrusted device may use its private key to decrypt the entitlement and begin playback of the protected media content based on the entitlement.

In one example, the untrusted device may send a request to the trusted device to renew the entitlement prior to expiration of the entitlement. For example, the entitlement may be set to expire halfway through playback of the action movie on the untrusted device. Therefore, before the entitlement expires, the untrusted device may request that the entitlement be extended for an additional period of time. The trusted device may forward the request to renew the entitlement to the authentication server, and the trusted device may include updated location information (e.g., the trusted device's current longitude and latitude) in the request. The trusted device may determine the updated location using GPS, wireless triangulation, NFC, Bluetooth LE, etc. The authentication server may compare the updated location information with the trusted device's previous location (i.e., the trusted device's location information in the outer encrypted message). Accordingly, the authentication server may generate a renewed entitlement when the trusted device's updated location is within a prescribed geographic limit in relation to the trusted device's previous location (e.g., 50-100 feet). The authentication server may encrypt the renewed entitlement using the untrusted device's public key and send the renewed entitlement to the untrusted device via the trusted device. The untrusted device may use the untrusted device's private key to decrypt the renewed entitlement and continue playback of the protected media content based on the renewed entitlement.

In the alternative renewal scenario, the authentication server may determine to not generate the renewed entitlement when the trusted device's updated location is outside the prescribed geographical limit in relation to the trusted device's previous location (e.g., greater than 50-100 feet). Thus, the request for the renewed entitlement may not be granted and the playback of the protected media content at the untrusted device may stop upon expiration of the entitlement.

FIG. 1 illustrates an exemplary system 100 for providing an entitlement for playback of protected media content on an untrusted device 130. In one example, a trusted device 120 may include a television and the untrusted device 130 may include a mobile device. The trusted device 120 may be authorized to play the protected media content (e.g., a soccer match), but the untrusted device 130 may not possess the necessary DRM credentials to play the protected media content. Thus, an authentication server 110 may generate a time-limited DRM entitlement for playback of the protected media content at the untrusted device 130 using the trusted device's location and identity information. The authentication server 110 may be combined with a media content server. Therefore, the untrusted device 130 may also play the protected media content (e.g., the soccer match) using the DRM entitlement. In an alternative configuration, the untrusted device 130 may play related (or unrelated) protected media content as compared to the trusted device 120.

Figure 2:
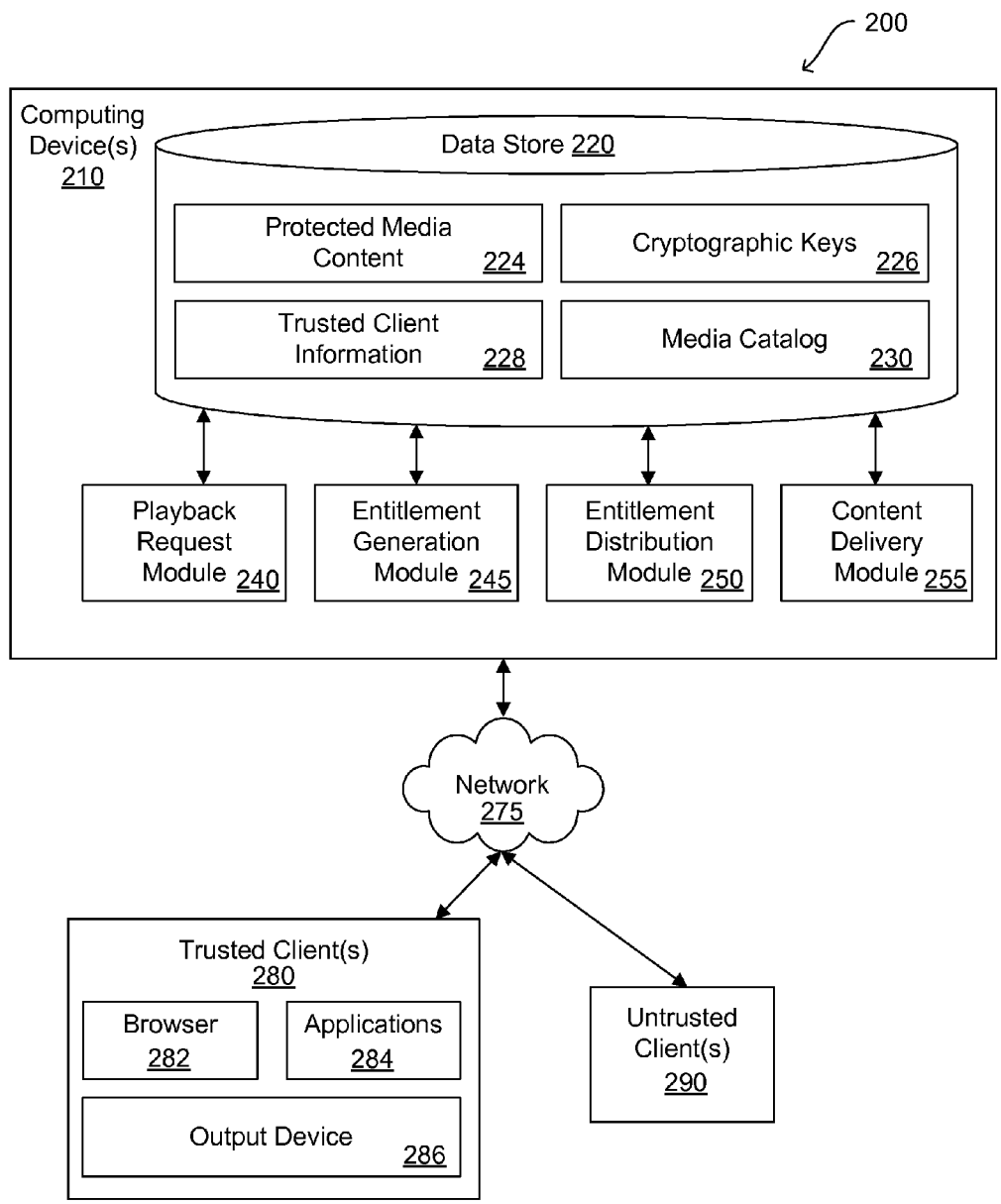
FIG. 2 is an illustration of a networked system for enabling playback of protected media content on an untrusted device according to an example of the present technology.

In the following discussion, a general description of an example system for allowing playback of protected media content on an untrusted device and the system's components are provided. The general description is followed by a discussion of the operation of the components in a system for the technology. FIG. 2 illustrates a networked environment 200 according to one example of the present technology. The networked environment 200 may include one or more computing devices 210 in data communication with a trusted client 280 and an untrusted client 290 by way of a network 275. The trusted client 280 may be the trusted device and the untrusted client 290 may be the untrusted device. In one example, the computing device 210 may be an authentication server that provides DRM information to enable the playback of protected media content on the untrusted client 290. The network 275 may include the Internet, intranets, extranets, wide area networks (WANs), local area networks (LANs), wired networks, wireless networks, or other suitable networks, etc., or any combination of two or more such networks.

Various applications and/or other functionality may be executed in the computing device 210 according to various embodiments. Also, various data may be stored in a data store 220 that is accessible to the computing device 210. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 220, for example, may be associated with the operation of the various applications and/or functional entities described below.

The data stored in the data store 220 may include protected media content 224. The protected media content 224 may be associated with an electronic retail store or a media content provider. The protected media content 224 may include, but is not limited to, digital music, videos, television shows, books, magazines, newspapers, games, apps, etc. In one example, the protected media content 224 may be protected using a digital rights management (DRM) protocol or similar technologies that control the sale, purchase and use of the protected media content 224. The protected media content 224 may be compatible for consumption or playback on a variety of electronic devices, such as televisions, mobile devices, mobile phones, game consoles, tablet computers, desktop computers, etc.

The data stored in the data store 220 may include cryptographic keys 226. The cryptographic keys may include parameters that determine a functional output of a cryptographic algorithm (i.e., an algorithm for performing encryption or decryption). The cryptographic keys 226 may specify a particular transformation of plaintext (i.e., unencrypted information) into cipher text (i.e., encrypted information) during encryption, or vice versa during decryption. The cryptographic keys 226 may include one or more asymmetric key pairs (i.e., a public key and a private key) or symmetric keys. The public key is generally made public, whereas the private key is generally kept a secret. Plaintext that is encrypted with the public key may be decrypted with its corresponding private key, whereas plaintext that is encrypted with the private key may be decrypted with its corresponding private key. The cryptographic keys 226 may include private and/or public key pairs that are associated with the computing device 210 (e.g., the authentication server), the trusted client 280 and/or the untrusted client 290.

The data stored in the data store 220 may include trusted client information 228. The trusted client information 228 may include location information and/or identity information that are associated with the trusted client 280. The location information received initially may include a longitude and latitude associated with the trusted client 280 (e.g., 40.7773° N, 111.8881° W). The identity information may include a device identity (e.g., the device's make and model, device hardware identification number) and a customer identity associated with the trusted client 280 (e.g., account information, the customer's name, electronic mail address, and/or billing information). In one example, the device hardware identification number may include a media access control (MAC) address.

The trusted client information 228 may also include updated location information associated with the trusted client 280. The updated location information may include one or more updated longitudes and latitudes that describe the trusted client's updated location (e.g., 40.6026° N, 111.8730° W). More specifically, the updated location information may be location information that is received after the initial DRM information is received to begin the initial media content access. The trusted client information 228 may include the updated location information for the trusted client 280 as updated at defined intervals (e.g., every 5 to 30 minutes).

The data stored in the data store may include a media catalog 230. The media catalog 230 may reference the media content 224 (e.g., digital music, videos, television shows, books, magazines, newspapers, games, and apps). The media catalog 230 may be associated with the electronic retail store or the media content provider. The media catalog 230 may allow users to search for the media content 224. The media catalog 230 may include information associated with the media content 224, such as price, ratings, reviews, similar items, etc. In addition, the media catalog 230 may allow the users to purchase the media content 224.

The components executed on the computing device 210 may include a playback request module 240, an entitlement generation module 245, an entitlement distribution module 250, a content delivery module 255, and other applications, services, processes, systems, engines, or functionality not discussed in detail herein. One or more of the modules 240, 245, 250, and 255 may be included on a computing device associated with a third party. In addition, the modules 240, 245, 250 and 255 may be included on one or more computing devices that are located in separate geographical locations or in separate computing devices that are co-located. The playback request module 240 may be configured to receive a request to entitle playback of the protected media content from a trusted client 280. The request may include an outer encrypted message with location information and identity information associated with the trusted client 280 and a nested encrypted message with a signed challenge that is processed by an untrusted client 290. The playback request module 240 may receive the signed challenge in the nested encrypted message in response to issuing a challenge to the untrusted client 290. In addition, the receiving playback request module 240 may receive a request to renew the entitlement for playback of the protected media content from the trusted client 280 upon expiration of the entitlement, where the request includes updated location information associated with the trusted client 280.

The entitlement generation module 245 may be configured to generate an entitlement (i.e., appropriate DRM keys) for the playback of the protected media content in response to validation of the request in the outer encrypted message and the nested encrypted message. More specifically, the entitlement generation module 245 may generate the entitlement based on the signed challenge and the location/identity information included in the nested encrypted message and outer encrypted message, respectively. The entitlement generation module 245 may generate the entitlement after decrypting the request from the trusted client 280 using public keys associated with the trusted client 280 and the untrusted client 290. The entitlement generation module 245 may encrypt the entitlement for playback of the protected media content with a public key associated with the untrusted client 290 and encrypt an outer entitlement message that includes the entitlement using a public key associated with the trusted client 280.

In addition, the entitlement generation module 245 may be configured to generate a renewed entitlement for playback of the protected media content when the trusted client's updated location is within a prescribed geographical limit with respect to the trusted client's previous location. Alternatively, the entitlement generation module 245 may be configured to not renew the entitlement for playback of the protected media content when the trusted client's updated location is not within the prescribed geographical limit with respect to the trusted client's previous location, which may stop playback at the untrusted client 290 upon expiration of the entitlement.

The entitlement distribution module 250 may be configured to send the entitlement to the untrusted client 290 via the trusted client 280. The entitlement may be included in the outer entitlement message that is encrypted using a public key associated with the trusted client 280, whereas the entitlement within the outer entitlement message may be encrypted using a public key associated with the untrusted client 290 to form a nested message. The entitlement sent by the entitlement distribution module 250 may enable the untrusted client 290 to begin the playback of the protected media content for a defined duration (e.g., 5-30 minutes). Alternatively, the entitlement may enable the untrusted client 290 to begin the playback for the length of the protected media content (e.g., an entire television show). In addition, the entitlement distribution module 250 may be configured to send the renewed entitlement to the untrusted client 290 via the trusted client 280, wherein the renewed entitlement enables the untrusted client 290 to continue playback of the protected media content for the defined duration.

The content delivery module 255 may be configured to deliver the protected media content to the trusted client 280 and/or the untrusted client 290. The content delivery module 255 may deliver the protected media content to the untrusted client 290 according to the entitlement that enables playback of the protected media content on the untrusted client 290 for a limited duration and while the trusted client 280 remains within a geographic proximity or area initially reported to the computing device 210. On the other hand, the content delivery module 255 may deliver the protected media content to the trusted client 280 because the DRM for the protected media content may allow playback of the protected media content on the trusted client 280.

Certain processing modules may be discussed in connection with this technology and FIG. 2. In one example configuration, a module of FIG. 2 may be considered a service with one or more processes executing on a server or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide ongoing access to the module or the third party access may be based on a per transaction access where the third party pays for specific transactions that are provided and consumed.

The computing device 210 may comprise, for example, a server computer or any other system providing computing capability. Alternatively, a plurality of computing devices 210 may be employed that are arranged, for example, in one or more server banks, computer banks or other computing arrangements. For example, a plurality of computing devices 210 together may comprise a cloud computing resource, virtualization server, a grid computing resource, and/or any other distributed computing arrangement. Such computing devices 210 may be located in a single installation or may be distributed among many different geographical locations. For purposes of convenience, the computing device 210 is referred to herein in the singular. Even though the computing device 210 is referred to in the singular, it is understood that a plurality of computing devices 210 may be employed in the various arrangements as described above.

The trusted client 280 and the untrusted client 290 are representative of a plurality of client devices that may be coupled to the network 275. The trusted client 280 and the untrusted client 290 may comprise, for example, a processor-based system such as a computer system. Such a computer system may be embodied in the form of a desktop computer, a laptop computer, personal digital assistants, cellular telephones, smartphones, set-top boxes, network-enabled televisions, music players, tablet computer systems, game consoles, electronic book readers, or other devices with like capability.

The trusted client 280 may be configured to execute various applications such as a browser 282, and/or other applications 284. The applications 284 may correspond to code that is executed in the browser 282 (e.g., web applications). The applications 284 may also correspond to standalone applications, such as networked applications. In addition, the trusted client 280 may be configured to execute applications 284 that include, but are not limited to, video playback applications, standalone applications, email applications, instant message applications, and/or other applications. In addition, the untrusted client 290 may also include a browser and/or applications (not shown in FIG. 2).

The trusted client 280 may include or be coupled to an output device 286. The browser 282 may be executed on the trusted client 280, for example, to access and render network pages (e.g. web pages) or other network content served up by the computing device 210 and/or other servers. The output device 286 may comprise, for example, one or more devices such as cathode ray tubes (CRTs), liquid crystal display (LCD) screens, gas plasma-based flat panel displays, LCD projectors, or other types of display devices, etc. In addition, the output device 286 may include an audio device, tactile device (e.g., braille machine) or another output device to feedback to a user. In addition, the untrusted client 290 may also include an output device (not shown in FIG. 2).

Figure 3A:
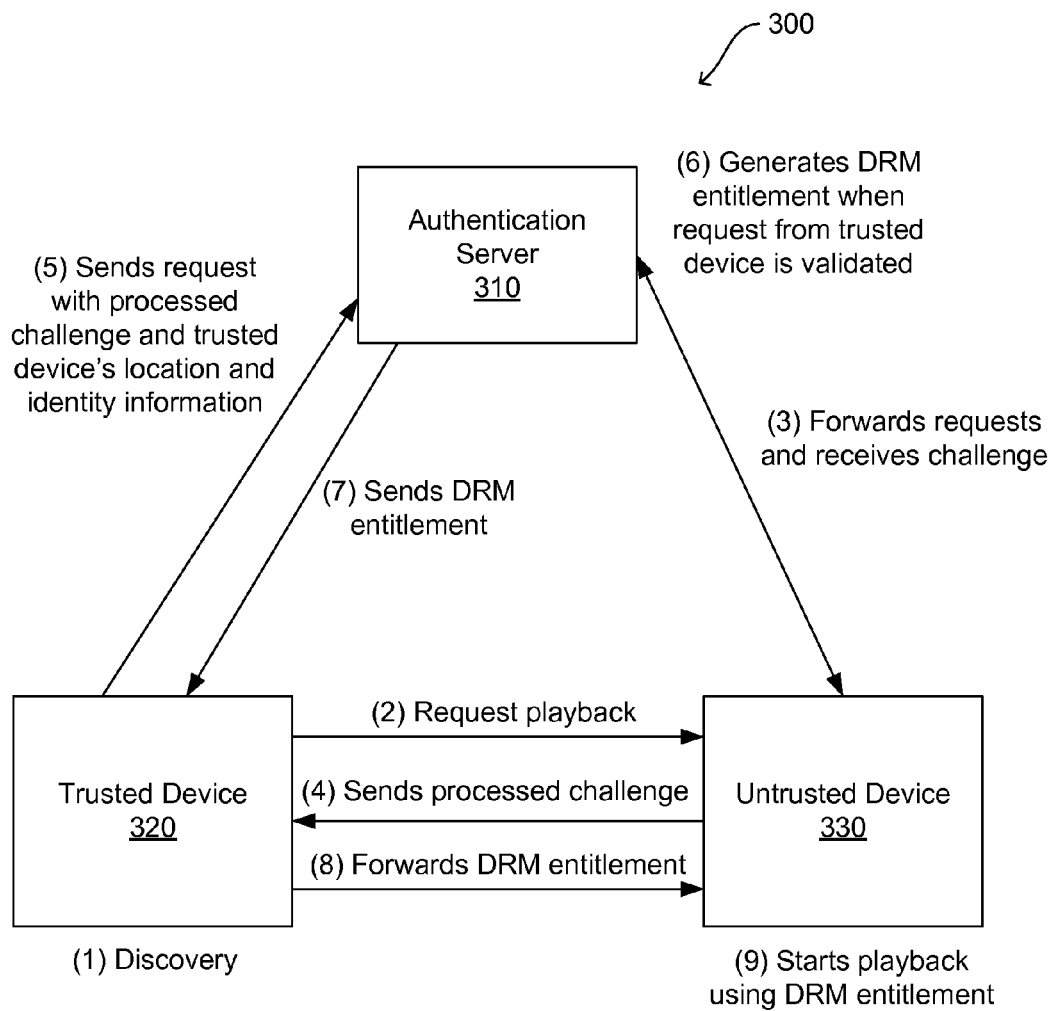
FIG. 3A illustrates another system and related operations for sending an entitlement for playback of protected media content to an untrusted device according to an example of the present technology.

FIG. 3A illustrates an exemplary system 300 and related operations for enabling an entitlement for playback of protected media content on an untrusted device 330. The protected media content may include songs, movies, television programs, games, etc. that are protected using digital rights management (DRM) or similar protection schemes. As described earlier, the term "trusted device" generally refers to an authenticated electronic device and the term "untrusted device" generally refers to an unauthenticated electronic device. The trusted device 320 and the untrusted device 330 types may include, but are not limited to, televisions, mobile devices, mobile phones, game consoles, tablet computers, etc.

As an example, the trusted device 320 (e.g., a game console) may be receiving the protected media content (e.g., a movie). A user may desire to receive the same protected media content on an additional device (e.g., a tablet computer that is untrusted). Alternatively, the user may desire to receive related protected media content on the additional device (e.g., an extended version of the movie, a version of the movie with subtitles). As an additional alternative example, the user may receive the protected media content on a tablet computer (e.g., the trusted device 320), but also desires to receive the protected media content on a game console (e.g., the untrusted device 330). In other words, the user may desire to initiate a "guest mode" for playback of the protected media content on an electronic device that is not trusted.

As described in greater detail below, an authentication server 310 may provide the entitlement for playback of the protected media content on the untrusted device 330 in response to receiving location information and identity information from a trusted device 320. The authentication server 310 may be combined with a media content server. The trusted device 320 may communicate with the authentication server 310 to handle the authentication and authorization for playback of the protected media content on the untrusted device 330 without sharing the trusted device's credentials with the untrusted device 330. In addition, the entitlement may be periodically renewed based on the trusted device's location remaining unchanged (within a specific distance tolerance). The entitlement may not be renewed when the trusted device 320 exceeds the specific distance tolerance, which may cease playback of the protected media content on the untrusted device 320.

The trusted device 320 may discover one or more devices (i.e., untrusted or trusted devices) that are capable of playback of the protected media content (step 1). The trusted device 320 may discover the devices using proprietary discovery techniques including, but not limited to, multicast domain name system (DNS), Bluetooth®, near field communication (NFC), infrared, local area network scanning, etc. In addition, the trusted device 320 may discover the device by scanning a local network (e.g., a wired or wireless network) in order to identify the devices that are connected to the network. In general, the trusted device 320 may discover the devices using any applicable discovery technique in order to establish a communication channel with the devices.

The trusted device 320 may determine whether a discovered device is trusted or untrusted. If both the trusted device 320 and the discovered device are trusted, the playback of the protected media content may simply be delegated to the discovered device that is trusted. When the discovered device is untrusted, a handshake may occur between the authentication server 310, the trusted device 320 and the untrusted device 330 to allow the playback on the untrusted device 330. After discovery, the trusted device 320 may verify that the untrusted device 330 is a DRM compatible device. In other words, playback of the protected media content may be unable to occur when the untrusted device 330 does not support DRM protocols.

The trusted device 320 may request playback of the protected media content on the untrusted device 330 (step 2). The trusted device 320 may initiate the request in response to receiving user instructions to play the protected media content on the untrusted device 330. The untrusted device 330 may receive the request from the trusted device 320 and forward the request to the authentication server 310 (step 3). The authentication server 310 may receive the request from the untrusted device 330 and send a challenge to the untrusted device 330. The untrusted device 330 may process the challenge and provide internal identifiers (IDs), time-based information, identity information (e.g., account information), etc. In one configuration, the untrusted device 330 may also provide its geographical location (e.g., latitude and longitude coordinates).

The untrusted device 330 may sign (or encrypt) the challenge using the untrusted device's private key and send the challenge to the trusted device 320 (step 4). The untrusted device 330 may send the untrusted device's public key along with the signed challenge (i.e., the untrusted device's public key may be attached to the signed encrypted message). Alternatively, the untrusted device's public key may be obtained from a third party. By signing the challenge, the untrusted device 330 may prove that the challenge is effectively coming from the untrusted device 330. Since the untrusted device's public key is the only key that can decrypt the signed challenge encrypted by the untrusted device's private key, decryption of the signed challenge using the untrusted device's public key may prove that the untrusted device's private key was indeed used to sign (i.e., encrypt) the signed challenge.

The trusted device 320 may receive the signed challenge from the untrusted device 330. The trusted device 320 may not decrypt the signed challenge in order to read the contents of the signed challenge. Rather, the trusted device 320 may further encrypt the signed challenge in a new request or message that includes the trusted device's location information and identity information. More specifically, the trusted device 320 may include the signed challenge as a nested encrypted message and wrap the nested encrypted message in an outer encrypted message. The outer encrypted message may include the trusted device's location information (e.g., the trusted device's longitude and latitude) and identity information (e.g., a device identity and customer identity associated with the trusted device 320). The trusted device 320 may send the request (i.e., the nested encrypted message and the outer encrypted message) to the authentication server 310 (step 5). In addition, the trusted device 320 may encrypt the request using the trusted device's private key in order to prove that the trusted device 320 sent the new request to the authentication server 310. In an alternative configuration, the trusted device 320 may encrypt the request using the authentication server's public key.

The authentication server 310 may receive the request (i.e., the nested encrypted message and the outer encrypted message) from the trusted device 320. The authentication server 310 may decrypt the outer encrypted message using the trusted device's public key in order to access the trusted device's location and identity information. In an alternative configuration, the authentication server 310 may decrypt the outer encrypted message using its private key when the outer encrypted message is encrypted with the authentication server's public key. In addition, the authentication server 310 may decrypt the nested encrypted message using the untrusted device's public key in order to access the signed challenge. Thus, the authentication server 310 may know the identity and/or location of the untrusted device 330 that desires to start the playback, the piece of protected media content (e.g., a television program) desired for playback on the untrusted device 330, and the trusted device's location and identity information.

The authentication server 310 may respond to the signed challenge by generating an entitlement (also known as a DRM entitlement or DRM lease) for playback of the protected media content on the untrusted device 330 when the request from the trusted device 320 (i.e., the nested encrypted message and the outer encrypted message) is successfully validated (step 6). The authentication server 310 may generate the entitlement using the untrusted device's identity information and location, the piece of protected media content for playback and/or the trusted device's location and identity information. Alternatively, the authentication server 310 may choose to not validate the request (i.e., the authentication server 310 may determine to not generate the entitlement) based on unfavorable or untrustworthy aspects of the untrusted device's identity information and location, the piece of protected media content for playback and/or the trusted device's location and identity information.

In one example, the entitlement may be time-limited (i.e., limited to a defined duration). The defined duration of the entitlement may vary depending on a mobility level associated with the trusted device 320 and/or the untrusted device 330. For example, a television or game console may be allowed a longer duration for the entitlement to remain valid for playback as compared to a mobile phone because the television or game console is generally less mobile than the mobile phone.

In another example, the defined duration of the entitlement may depend on whether a geographical location associated with the untrusted device 330 is known. For example, the defined duration may be longer when the untrusted device's geographical location is known as compared to when the untrusted device's geographical location is unknown. In other words, an awareness of the untrusted device's geographical location may establish additional trust with the untrusted device 330 which may result in an increased duration of the entitlement.

Alternatively, the entitlement may be limited to a particular piece of protected media content (e.g., a specific television episode). This means the entitlement may not expire until a specific program or episode of a program ends. In addition, the entitlement may enable playback to occur on the untrusted device 330 without exposing the untrusted device 330 to the trusted device's credentials (e.g., customer information and identity information), therefore maintaining the security of the trusted device 320.

The authentication server 310 may send the entitlement to the trusted device 320 (step 7). The authentication server 310 may encrypt the entitlement using a public key associated with the untrusted device 330 and encrypt an outer entitlement message that contains the entitlement using a public key associated with the trusted device 320. In other words, the authentication server 310 may wrap the entitlement in the outer entitlement message, such that the entitlement is nested in the outer entitlement message. In addition, the outer entitlement message may contain metadata to instruct the trusted device 320 to send the entitlement on to the untrusted device 330.

The trusted device 320 may receive the outer entitlement message with the entitlement from the authentication server 310. The trusted device 320 may then decrypt the outer entitlement message using the trusted device's private key since the authentication server 310 encrypted the outer entitlement message using the trusted device's public key. The trusted device 320 may be unable to decrypt the entitlement within the outer entitlement message because the trusted device 320 does not have access to the untrusted device's private key. However, decryption of the outer entitlement message may notify the trusted device 320 to send the entitlement to the untrusted device 330. Thus, the trusted device 320 may send the entitlement to the untrusted device 330 (step 8). The untrusted device 330 may receive the entitlement from the trusted device 320 and decrypt the entitlement using the untrusted device's private key and begin playback of the protected media content for the defined duration based on the entitlement (step 9).

In the configuration described above, the untrusted device 330 may receive the entitlement from the authentication server 310 via the trusted device 320. In an alternative configuration, the untrusted device 330 may communicate directly with the authentication server 310 in order to receive the entitlement. As a more specific example of such a direct communication, the trusted device 320 may request the playback from the untrusted device 330. The untrusted device 330 may forward the request to the authentication server 310 and in response, receive the challenge from the authentication server 310. The untrusted device 330 may process the challenge and send the challenge directly to the authentication server 310 (rather than the trusted device 320). The authentication server 310 may, upon receiving the challenge, communicate with the trusted device 320 in order to obtain the trusted device's location and identity information. The authentication server 310 may generate the entitlement using the trusted device's location and identity information and send the entitlement directly to the untrusted device (rather than the authentication server 310 sending the entitlement to the trusted device 320 and the trusted device 320 forwarding the entitlement to the untrusted device 330).

As another example of use of the entitlement, the untrusted device 330 may execute various applications (e.g., an online marketplace application) when located within the prescribed geographical limit (e.g., 30 feet) in relation to the trusted device 320 according to an entitlement generated by the authentication server 310. The trusted device 320 may be a human parent's device and the untrusted device 330 may be the parents' child's device. The application on the child's device may be authorized to work (i.e., the entitlement allows use of the application) when the child's device is within the prescribed geographical limit in relation to the parent's device, but the application may not work when the child's device is located too far away from the parent's device (e.g., greater than 30 feet).

As another example, a plurality of untrusted devices 330 may be authorized for playback of protected media content (e.g., a movie). The trusted device 320 may play a related version of the protected media content as compared to the untrusted devices 330. For example, the untrusted device's version of the movie may include advertisements, whereas the trusted device's version of the movie does not include advertisements. The protected media content that is played on the untrusted devices 330 may have an uniform resource locator (URL) that is different than the URL used by the trusted device 320 to play the movie without advertisements. The untrusted devices 330 may travel away from the trusted device 320 during playback because the entitlement may limit the playback on the untrusted devices 330 to the specific pieces of protected media content (e.g., the movie with advertisements).

Figure 3B:
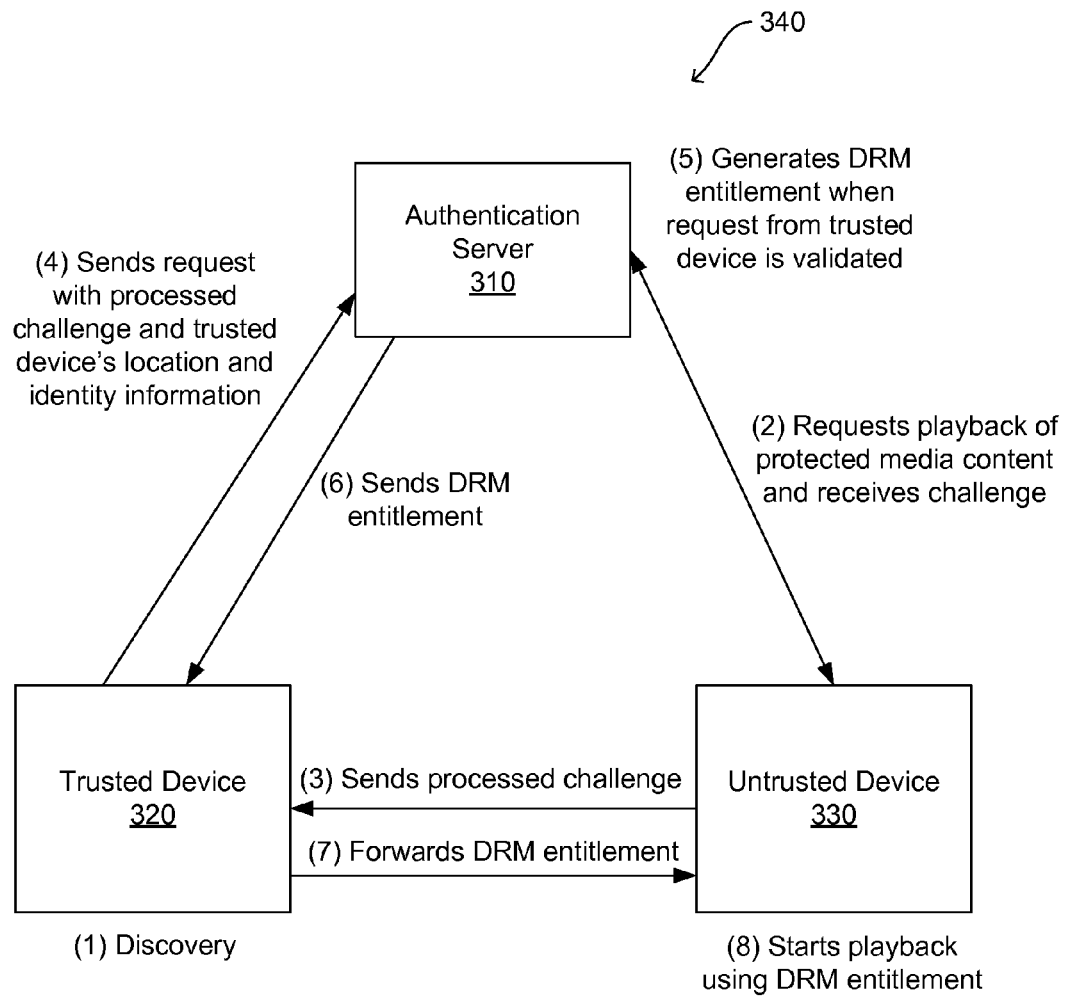
FIG. 3B illustrates yet another system and related operations for sending an entitlement for playback of protected media content to an untrusted device according to an example of the present technology.

FIG. 3B illustrates an alternative configuration of an exemplary system 340 and related operations for enabling an entitlement for playback of protected media content on an untrusted device 330. A trusted device 320 may discover the untrusted device 330 that is capable of playback of the protected media content (step 1). After discovery, the untrusted device 330 may request playback of the protected media content from an authentication server 310 (step 2). In other words, the untrusted device 330 may send the request directly to the authentication server 310, as opposed to the trusted device 320 sending the request to the untrusted device 330 and the untrusted device 330 forwarding the request to the authentication server 310 (as described in FIG. 3A).

The authentication server 310 may respond to the request by issuing a challenge to the untrusted device 330. The untrusted device 330 may send a processed challenge to the trusted device 320 (step 3). The trusted device 320 may send a request with the processed challenge and the trusted device's location and identity information to the authentication server 310 (step 4). The authentication server 310 may generate a digital rights management (DRM) entitlement for the playback on the untrusted device 330 when the request from the trusted device 320 is successfully validated (step 5). The authentication server 310 may send the DRM entitlement to the trusted device 320 (step 6). The trusted device 320 may forward the DRM entitlement to the untrusted device 330 (step 7). The untrusted device 330 may start playback of the protected media content based on the DRM entitlement (step 8).

Figure 4:
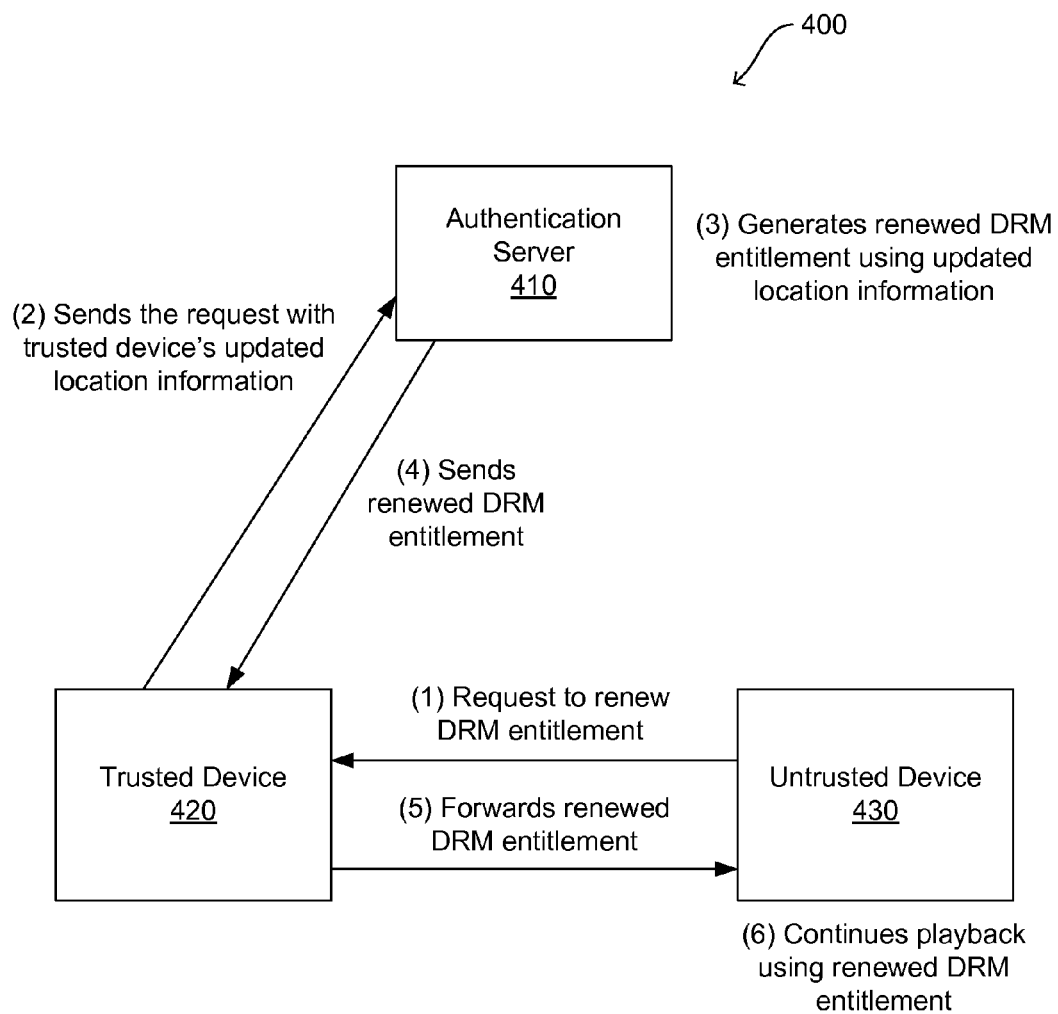
FIG. 4 illustrates a system and related operations for renewing an entitlement for playback of protected media content on an untrusted device according to an example of the present technology.

FIG. 4 illustrates an exemplary system 400 for renewing the entitlement for playback of the protected media content on the untrusted device 430. As previously discussed, the entitlement may be in effect for the defined duration (e.g., 10 minutes). However, if the untrusted device 430 is playing protected media content that exceeds the length of the defined duration (e.g., the protected media content is 90 minutes long but the entitlement last 20 minutes), the entitlement may be periodically renewed in order for the untrusted device 430 to continue playing the protected media content without the entitlement timing out. Before expiration of the entitlement, the untrusted device 430 may send a request to renew the entitlement to a trusted device 420 (step 1). The request may occur before expiration of the entitlement so that the playback on the untrusted device 430 remains continuous.

The trusted device 420 may receive the request from the untrusted device 430. The trusted device 420 may forward the request to an authentication server 410 along with the trusted device's updated location information (step 2). The updated location information may indicate the trusted device's current latitude and longitude coordinates. In an alternative configuration, the trusted device 420 may detect that the entitlement is about to expire (without having to be informed by the untrusted device 430) and automatically send the request along with the updated location information to the authentication server 410.

The authentication server 410 may receive the request and the trusted device's updated location information from the trusted device 420. The authentication server 410 may compare the updated location information for the trusted device 420 with the trusted device's location information received initially (i.e., the trusted device's previous location used to generate the entitlement). If the updated location information is within the prescribed geographical limit (e.g., the trusted device 420 has moved less than 50 feet since its previous location), the authentication server 410 may generate a renewed entitlement (step 3).

In one alternative example, the trusted device's geographical location may be fixed, but the untrusted device 430 has moved since the entitlement was generated. Since the trusted device 420 has remained stationary (i.e., not moved beyond the prescribed geographical limit), the entitlement may be renewed.

In one alternative example, the request from the untrusted device 430 may include the untrusted device's current geographical location (e.g., the untrusted device's current latitude and longitude coordinates). Accordingly, the authentication server 430 may renew the entitlement when the trusted device 420 and the untrusted device 430 have moved simultaneously, but the distance between the trusted device 420 and the untrusted device 430 (as indicated by the untrusted device's current geographical location in relation to the trusted device's updated location) does not exceed a predetermined distance. In addition, the distance may be measured between the trusted and untrusted devices using NFC, Wi-Fi signals, infrared signals, radio signals or other technology to determine the distance between the trusted and untrusted devices.

The authentication server 410 may encrypt the renewed entitlement using the untrusted device's public key. In addition, the authentication server 410 may wrap the renewed entitlement in an outer renewed entitlement message that is encrypted with the trusted device's public key. The authentication server 410 may send the outer renewed entitlement message (which contains the renewed entitlement) to the trusted device 420 (step 4). The trusted device 420 may decrypt the outer renewed entitlement message using the trusted device's private key in order to determine that the renewed entitlement is to be forwarded to the untrusted device 430.

The trusted device 420 may send the renewed entitlement to the untrusted device 430 (step 5). The untrusted device 430 may receive the renewed entitlement from the trusted device 420. The untrusted device 430 may decrypt the renewed entitlement using its private key and continue playback of the protected media content for the defined duration based on the renewed entitlement (step 6).

Figure 5:
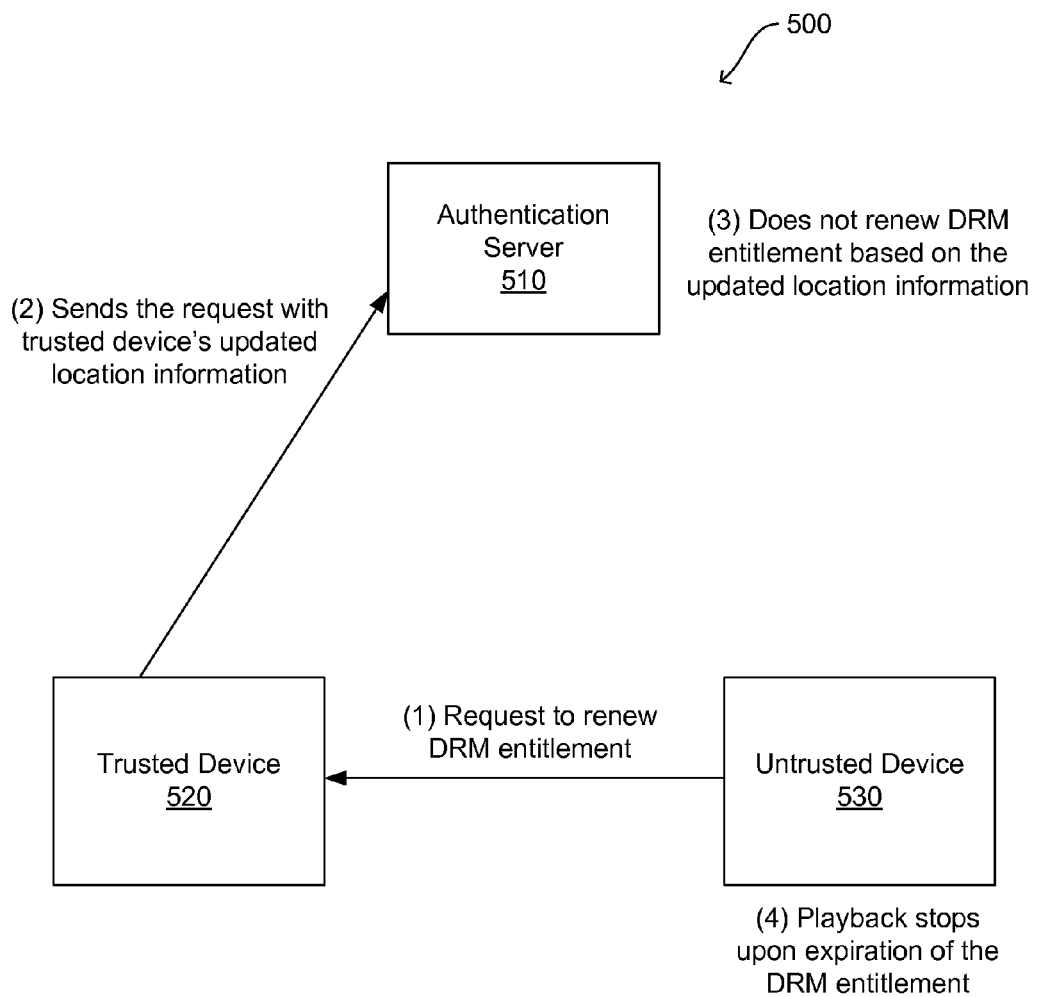
FIG. 5 illustrates a system and related operations for determining to not renew an entitlement for playback of protected media content on an untrusted device according to an example of the present technology.

FIG. 5 illustrates an exemplary system 500 for determining to not renew the entitlement for playback of protected media content on the untrusted device 530. Before expiration of the entitlement, the untrusted device 530 may send a request to renew the entitlement to a trusted device 520 (step 1). The trusted device 520 may forward the request to an authentication server 510 along with the trusted device's updated location information (step 2). The authentication server 510 may compare the updated location information with the trusted device's previous location (i.e., the location used to generate the entitlement). If the trusted device's updated location is not within the prescribed geographical limit in relation to the trusted device's previous location (e.g., the trusted device 520 has moved greater than 50 feet in comparison to its previous location), the authentication server 510 may determine to not generate the renewed entitlement (step 3). Thus, the "guest mode" playback may cease at the untrusted device 530 because the trusted device 520 has exceeded a certain distance from its original geographic position.

In an alternative configuration, the "guest mode" playback may cease at the untrusted device 530 because the trusted device 520 and the untrusted device 530 have moved more than the predetermined distance away from each other. The distance may be measured between the trusted and untrusted devices using NFC, Wi-Fi signals, infrared signals, radio signals, etc.

In an alternative example, the authentication server 510 may determine to not renew the entitlement when: a threshold for the number of renewed entitlements has been reached (e.g., five renewed entitlements), an absolute time threshold has been reached (e.g., five hours), or the entitlement was limited to a particular piece of protected media content (e.g., a particular movie) and that piece of protected media content has been entirely played on the untrusted device 530.

Figure 6:
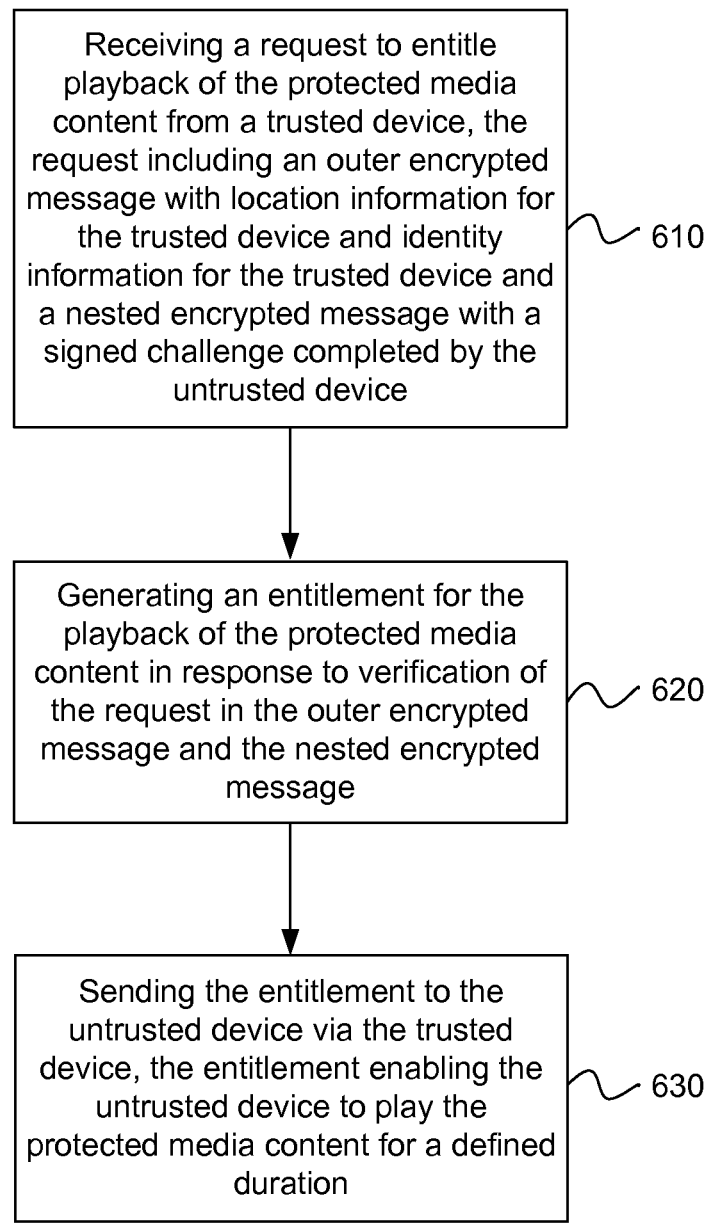
FIG. 6 is a flowchart of an example method for allowing playback of protected media content on an untrusted device using a trusted computing device.

FIG. 6 illustrates an example of a method for allowing playback of protected media content on an untrusted device. A request to entitle playback of the protected media content may be received from a trusted device, as in block 610. In one example, an authentication server may receive the request for playback of the protected media content on the untrusted device from the trusted device. The request may include an outer encrypted message with location information for the trusted device and identity information for the trusted device, as well as a nested encrypted message with a signed challenge that is processed by the untrusted device. The authentication server may receive the signed challenge in the nested encrypted message after issuing a challenge to the untrusted device.

An entitlement for the playback of the protected media content may be generated in response to verification of the request in the outer encrypted message and the nested encrypted message, as in block 620. In other words, the authentication server may generate the entitlement in response to receiving the trusted device's location information and identity information. The entitlement may also be known as a digital rights management (DRM) entitlement or a DRM lease. The authentication server may generate the entitlement after decrypting the request to entitle playback of the protected media content received from the trusted device. The authentication server may decrypt the outer encrypted message and the nested encrypted message in the request using public keys associated with the trusted device and the untrusted device, respectively. In addition, after generating the entitlement, the authentication server may encrypt the entitlement using a public key associated with the untrusted device and encrypt an outer entitlement message that contains the entitlement using a public key associated with the trusted device.

The entitlement may be sent to the untrusted device via the trusted device, as in block 630. The entitlement may enable the untrusted device to begin the playback of the protected media content for a defined duration (e.g., 10 minutes). In other words, the authentication server may send the encrypted entitlement in an outer entitlement message to the trusted device. The trusted device may decrypt the outer entitlement message and determine to send the entitlement within the outer entitlement message to the untrusted device. The untrusted device may decrypt the entitlement in order to begin playback of the protected media content for the defined duration.

In one example, the authentication server may receive a request to renew the entitlement for playback of the protected media content from the trusted device upon expiration of the entitlement. The request may include updated location information associated with the trusted device. The authentication server may generate a renewed entitlement for playback of the protected media content when the updated location information is within a prescribed geographical limit with respect to the location information received initially (i.e., the trusted device's location included in the outer encrypted message). The authentication server may send the renewed entitlement to the untrusted device via the trusted device, and the renewed entitlement may enable the untrusted device to continue playback of the protected media content for the defined duration. Alternatively, the authentication server may determine to not renew the entitlement for playback of the protected media content when the updated location information associated with the trusted device is not within the prescribed limit with respect to the location information received initially, thereby effectively stopping playback at the untrusted device upon expiration of the entitlement.

Figure 7:
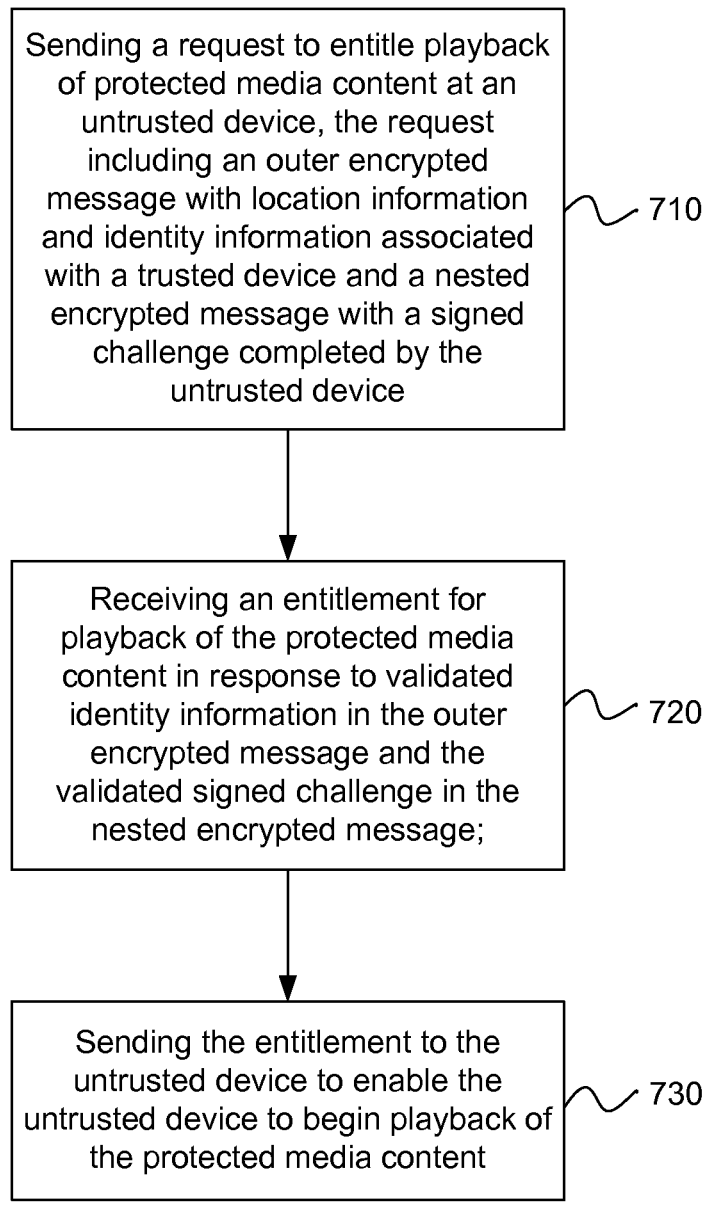
FIG. 7 is another flowchart of a computer implemented method for allowing playback of protected media content on an untrusted device using a trusted computing device.

FIG. 7 illustrates an example of a computer implemented method for allowing playback of protected media content. The protected media content (e.g., audio files, video files) may be protected using digital rights management (DRM). A request may be sent to entitle playback of protected media content at an untrusted device, as in block 710. In one example, a trusted device may send the request to an authentication server. The request may include an outer encrypted message with location information and identity information associated with a trusted device and a nested encrypted message with a signed challenge that is processed by the untrusted device.

The location information may include a longitude and latitude associated with the trusted device and the identity information may include a device identity and a customer identity associated with the trusted device. The trusted device may receive the signed challenge (which the trusted device includes in the nested encrypted message) from the untrusted device in response to the trusted device requesting the playback of the protected media content from the untrusted device. In other words, the trusted device may make the request to the authentication server after receiving the signed challenge from the untrusted device. In addition, the trusted device may make the request after discovering the untrusted device that is capable of the playback of the protected media content.

An entitlement for playback of the protected media content may be received based on validated identity information in the outer encrypted message and the validated challenge in the nested encrypted message, as in block 720. The trusted device may receive the entitlement in response to the location information included in the outer encrypted message that the trusted device previously sent to the authentication server.

The entitlement may be sent to the untrusted device to enable the untrusted device to begin playback of the protected media content, as in block 730. The trusted device may decrypt the outer entitlement message received from the authentication server using its private key in order to identify the untrusted device as a recipient of the entitlement. After receiving the entitlement, the untrusted device may decrypt the entitlement using its private key and begin playback of the protected media content. In one configuration, the playback of the protected media content may be for a defined time period depending on a mobility level associated with the trusted device. For example, a television may be allowed to playback protected content for a longer duration as compared to a tablet computer because the television generally has less mobility than the tablet computer.

Figure 8:
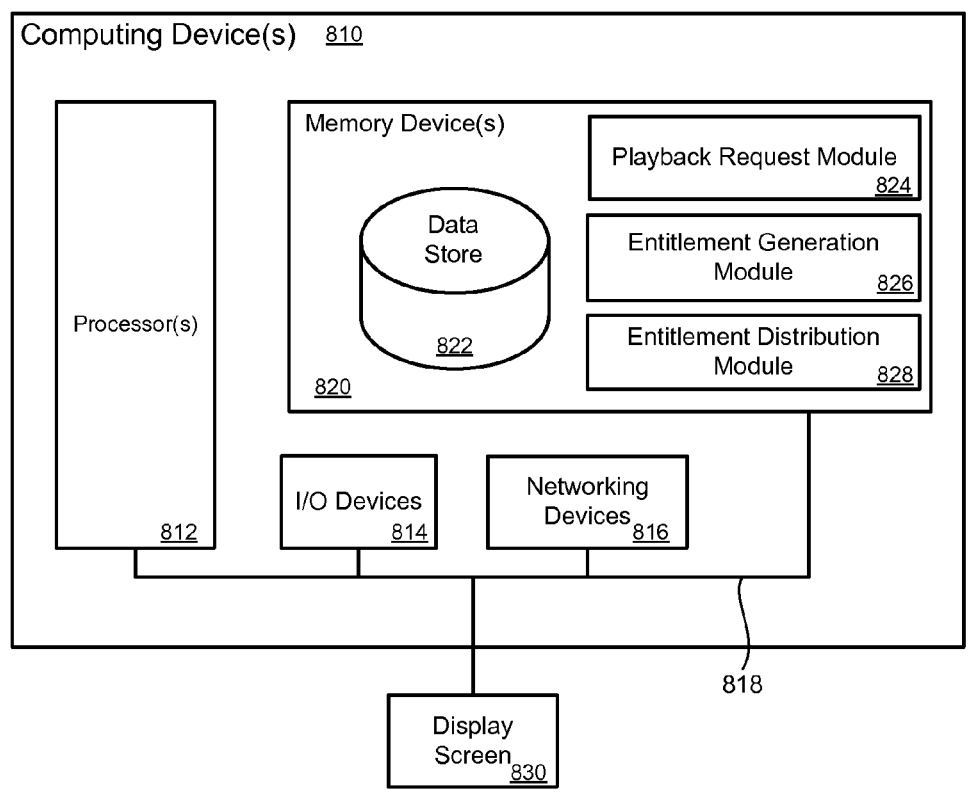
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules that are executable by the processor(s) 812 and data for the modules. Located in the memory device 820 are modules executable by the processor. For example, a playback request module 824, an entitlement generation module 826, an entitlement distribution module 828, and other modules may be located in the memory device 820. The modules may execute the functions described earlier. A data store 822 may also be located in the memory device 820 for storing data related to the modules and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen 830 that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for allowing playback of protected media content on an untrusted device, the method comprising:
    under control of one or more computer systems configured with executable instructions:
    receiving a first request to entitle playback of the protected media content on an untrusted device;
    issuing a challenge to the untrusted device in response to the first request;
    receiving a second request to entitle playback of the protected media content from a trusted device, the second request including an outer encrypted message with location information for the trusted device and identity information for the trusted device and a nested encrypted message with the challenge digitally signed by the untrusted device;
    generating an entitlement for the playback of the protected media content in response to verification of the outer encrypted message and the nested encrypted message, wherein the entitlement is generated by encrypting the entitlement using a public key associated with the untrusted device and encrypting an outer entitlement message that includes the entitlement using a public key associated with the trusted device; and
    sending the entitlement to the untrusted device via the trusted device, the entitlement enabling the untrusted device to play the protected media content for a defined duration.

2. The method of claim 1, further comprising:
    receiving a request to renew the entitlement for playback of the protected media content from the trusted device upon expiration of the entitlement, the request including updated location information associated with the trusted device;
    generating a renewed entitlement for playback of the protected media content when the updated location information is within a prescribed limit with respect to the location information; and
    sending the renewed entitlement to the untrusted device via the trusted device, the renewed entitlement enabling the untrusted device to continue playback of the protected media content for the defined duration.

3. The method of claim 1, further comprising:
receiving a request to renew the entitlement for playback of the protected media content from the trusted device upon expiration of the entitlement, the request including updated location information associated with the trusted device; and
determining to not renew the entitlement for playback of the protected media content when the updated location information associated with the trusted device is not within the prescribed limit with respect to the location information, thereby stopping playback at the untrusted device upon expiration of the entitlement.

4. The method of claim 1, further comprising receiving the signed challenge processed by the untrusted device in the nested encrypted message in response to issuing a challenge to the untrusted device.

5. The method of claim 1, further comprising decrypting the outer encrypted message using a key associated with the trusted device and decrypting the nested encrypted message using a key associated with the untrusted device.

6. A computer implemented method, the method comprising:
under control of one or more computer systems configured with executable instructions:
sending a request to entitle playback of protected media content at an untrusted device, the request including an outer encrypted message with location information and identity information associated with a trusted device and a nested encrypted message with a challenge digitally signed by the untrusted device, wherein the challenge is issued to the untrusted device in response to the untrusted device requesting an entitlement to perform playback of the protected media content;
receiving an entitlement for playback of the protected media content in response to validated identity information in the outer encrypted message and the validated signed challenge in the nested encrypted message, wherein the entitlement is received at the trusted device and is contained in an outer entitlement message that is encrypted with a public key associated with the trusted device and the entitlement in the outer entitlement message is encrypted with a public key associated with the untrusted device; and
sending the entitlement to the untrusted device to enable the untrusted device to begin playback of the protected media content.

7. The method of claim 6, further comprising:
receiving a request from the untrusted device to renew the entitlement for playback of the protected media content before expiration of the entitlement; and
sending the request to renew the entitlement along with updated location information associated with the trusted device.

8. The method of claim 7, further comprising
receiving a renewed entitlement for playback of the protected media content at the trusted device when the updated location information associated with the trusted device is within a prescribed geographical limit in relation to the untrusted device; and
sending the renewed entitlement to the untrusted device to enable the untrusted device to continue playback of the protected media content for a defined duration.

9. The method of claim 6, wherein the location information includes a longitude and latitude associated with the trusted device and the identity information includes a device identity or a customer identity associated with the trusted device.

10. The method of claim 6, further comprising sending the entitlement to the untrusted device to enable playback of the protected media content for a defined time period depending on a mobility level associated with the trusted device.

11. The method of claim 6, further comprising:
decrypting the outer entitlement message using a private key associated with the trusted device in order to identify the untrusted device as a recipient of the entitlement; and
sending the entitlement to the untrusted device, wherein the untrusted device extracts the entitlement using a private key associated with the untrusted device in order to begin playback of the protected media content.

12. The method of claim 6, further comprising receiving, at the trusted device, the challenge that is digitally signed from the untrusted device after the untrusted device is issued the challenge from a server.

13. The method of claim 6, further comprising discovering the untrusted device that is capable of the playback of the protected media content.

14. The method of claim 6, wherein the protected media content includes digital rights management (DRM) protected media content.

15. A system for allowing playback of protected media content, the system comprising:
a processor;
a memory device including a data store to store a plurality of data and instructions that, when executed by the processor, cause the processor to:
receive a first request to entitle playback of the protected media content on an untrusted device;
issue a challenge to the untrusted device in response to the first request;
receive a second request to entitle playback of the protected media content from a trusted device, the second request including an outer encrypted message with location information and identity information associated with the trusted device and a nested encrypted message with the challenge digitally signed by an untrusted device;
generate an entitlement for the playback of the protected media content in response to validation of the outer encrypted message and the nested encrypted message, wherein the entitlement is encrypted with a public key associated with the untrusted device and encrypt an outer entitlement message that includes the entitlement using a public key associated with the trusted device; and
send the entitlement to the untrusted device via the trusted device, the entitlement enabling the untrusted device to begin the playback of the protected media content for a defined duration.

16. The system of claim 15, wherein the plurality of data and instructions, when executed by the processor, cause the processor to:
receive a request to renew the entitlement for playback of the protected media content from the trusted device, the request including updated location information associated with the trusted device;
generate a renewed entitlement for playback of the protected media content when the updated location information is within a prescribed geographical limit with respect to the location information; and
send the renewed entitlement to the untrusted device via the trusted device, the renewed entitlement enabling the untrusted device to continue playback of the protected media content for the defined duration.

17. The system of claim 15, wherein the plurality of data and instructions, when executed by the processor, cause the processor to: determine to not renew the entitlement for playback of the protected media content when the updated location information associated with the trusted device is not within the prescribed limit with respect to the location information, thereby stopping playback at the untrusted device upon expiration of the entitlement.

18. The system of claim 15, wherein the trusted device is configured to decrypt the outer entitlement message with a private key associated with the trusted device and relay the entitlement in the outer entitlement message to the untrusted device.

\* \* \* \* \*